March 6, 1962 N. R. KORNFIELD 3,024,446

ONE CORE PER BIT SHIFT REGISTER

Filed May 2, 1955

INVENTOR.
NATHANIEL R. KORNFIELD

BY George Baran

ATTORNEY

United States Patent Office 3,024,446

Patented Mar. 6, 1962

3,024,446

ONE CORE PER BIT SHIFT REGISTER

Nathaniel R. Kornfield, Camden, N.J., assignor to Burroughs Corporation, Detroit, Mich., a corporation of Michigan Filed May 2, 1955, Ser. No. 505,209
21 Claims. (Cl. 340—174)

This invention relates to magnetic shift registers in general and more particularly to a single core per bit type of shift register.

It is desirable, in many digital computing devices, to shift information stored in one element to other elements of an array of storage elements of such a computing device. The storage elements, when a binary code is employed in the computing device, will generally, though not necessarily, comprise magnetic cores. Such cores have a square hysteresis loop characteristic and are equipped with windings thereon which, in response to voltage signals applied thereto, may cause the cores to be momentarily saturated in either a state of positive or negative magnetism, depending upon the orientation of such windings and the direction of current therethrough. When the voltage signals are removed, the saturated core returns to a static residual or remanent magnetism state which is likewise in a positive or negative direction corresponding to the direction of saturation, and is representative of one binary number or the other. Each of the cores in the array is a binary element and may form a part of a larger binary system which manipulates information because of the bi-state property of a magnetic core. When the static flux direction in one of these cores is changed, a voltage induced in an output winding, wound on such core and also connected to an input winding of a second core, may cause a magnetomotive force in the second core to change the static flux direction in said second core, thus switching said second core from one binary state to the other. When a magnetomotive force is applied to any core in the array in the same direction as the static flux direction of that core, only a negligible change in flux within such core takes place, and consequently there is no transfer of stored information to another core.

In transferring information stored in a first core to a second core, it is necessary to clear the second core of the information stored therein prior to transferring the stored information from the first core into the second core. Such requirement places upon some prior art magnetic shift registers the restriction that one current pulse is required to remove information from one core and store said removed information in a temporary storage element, such as another core, while the other cores are being cleared by the same voltage pulse, and a second voltage pulse is needed to remove the information residing in the temporary storage element to a core that was cleared of its information by the first current pulse. Such a shift register is termed a two core per bit shift register because two cores are required to transfer a single bit of information. A disadvantage of a two core per bit shift register lies in the fact that two magnetic cores with their attendant circuit windings and diodes are required for each bit of information and two separate sequential actuating pulses are needed to effect the shifting of binary information from one core to another.

The instant invention utilizes a single core and a single current pulse to effectuate the transfer of stored information from one core to another core in an array of core stages constituting a magnetic shift register. Such a shift register, namely, a one core per bit shift register, is known in the prior art and is incorporated in digital computing devices to avoid the drawbacks of shift registers employing two cores per bit. Such prior art one core per bit shift registers generally read out a core and simultaneously clear out other cores with a single voltage pulse, store the energy obtained during the readout in a suitable storage circuit, and when the voltage pulse is terminated, transfer the stored energy through an appropriate transfer loop to a cleared core. A difficulty encountered in prior art one core per bit shift registers lies in the failure or unreliability of the means for storing and transferring the information read out of the transferor core to the transferee core. Very often the energy stored in the transfer loop will be released prematurely and will tend to switch the transferee core before said core has been cleared. Furthermore, the clearing of the transferee core may result in an undesired transfer of energy back through the transfer loop coupling the transferor core and transferee core such that the switching of the transferor core will be impeded or even nullified.

Accordingly, it is an object of this invention to provide an improved one core per bit magnetic shift register.

It is a further object to provide a reliable storage and transfer means for a one core per bit shift register.

Yet another object is to provide improved reversible transfer loop in a one core per bit type of shift register.

A still further object is to provide an inhibit circuit for a one core per bit type of shift register.

These and other objects and advantages of the invention will be brought out in the following description taken in conjunction with the accompanying drawings wherein.

Figure 1:
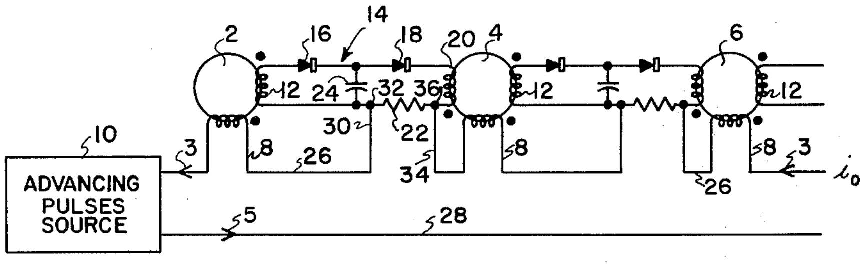
FIGURE 1 is a schematic diagram of an embodiment of a transfer loop of the invention.

FIGURE 1 shows three binary elements 2, 4 and 6 which may be, though are not necessarily, magnetic cores. These elements comprise just three of a plurality of bistable elements of a shift register, it being understood that there may be many more such elements throughout the shift register. Shift windings 8 are associated with each core. Advancing pulses from source 10 are applied to windings 8 so as to cause current to flow into the dotted terminals of these windings, the dot notation signifying that a current entering the dotted terminal of a winding will tend to shift the core assocated with said winding to a "0" state. If a core, such as core 2, is in a "1" state when current enters the dotted terminal of its shift winding 8, the current will tend to switch the core into its opposite magnetic remanent state, causing a voltage to appear across output winding 12, leaving core 2 in a "0" state.

The transfer loop 14 from winding 12 consists of a diode 16 in series with a second diode 18, input winding 20 and resistance 22. A capacitor 24 is coupled to one end of winding 12, and has one terminal interposed between the two diodes. Advancing pulses from source 10 travel along conductors 26 and 28 in the direction of the arrows 3 and 5. Periodically throughout the shift register, conductor 26 is broken and one end 30 of the broken conductor 26 is joined to a terminal 32 of resistance 22 and the other end 34 of the broken conductor 26 is joined to the opposite terminal 36 of resistance 22.

Assume, for purposes of explanation only, that core 2 is in a "1" state and all the other cores are in a "0" state, it being understood that the instant invention applies whatever the binary state of each core is. When a pulse from source 10 initiates a current into the dotted terminal of winding 8, the voltage induced in winding 12 will be such as to cause current flow out of the dotted terminal of winding 12, the diodes 16 and 18 being orientated in the direction of least resistance to such current flow. Since cores 4 and 6 are in their respective "0" states, relatively negligible current flow will be inducted in the output windings 12 associated with said cores 4 and 6.

The transfer of the "1" from core 2 to core 4 must be delayed long enough for core 4 to be cleared of its information with an advancing pulse, and the transfer should be completed as soon as the advancing pulse terminates, in order to attain the objects of this invention. Applicant accomplishes such delay and transfer by sending through resistance 22 the same advancing current that goes through windings 8. The potential drop that results across resistance 22 during the application of an advancing pulse from source 10 is in such a direction as to apply a back bias to diode 18, which serves as a unidirectional gating means, to prevent conduction in response to readout potentials induced in winding 12. The diode 18 is back biased so long as current flows through conductor 26 in the direction of the arrow 3. The induced output voltage obtained across winding 12 during the switching of core 2 from its "1" state to its "0" state will produce a current in transfer loop 14 such as to go through diode 16 and charge capacitor 24. Were it not for the current through resistance 22, the current going through diode 16 would also be flowing through diode 18 and pass through input winding 20, thus undesirably opposing and nullifying the effect of clearing current passing through winding 8 associated with core 4.

As soon as the advancing pulse from source 10 terminates and said pulse has been effective in clearing the cores of their stored information, the biasing potential no longer exists across resistor 22. As a consequence, the diode 18 is no longer biased, and the entire charge stored on capacitor 24 discharges through diode 18, winding 20 and resistance 22. It is noted that the discharge cannot take place through diode 16 since said diode is oriented in the direction to oppose flow of the discharge current. The discharge from capacitor 24 through winding 20 is through the undotted terminal of winding 20 and, hence, serves to store a "1" in the core stage 4.

Figure 2:
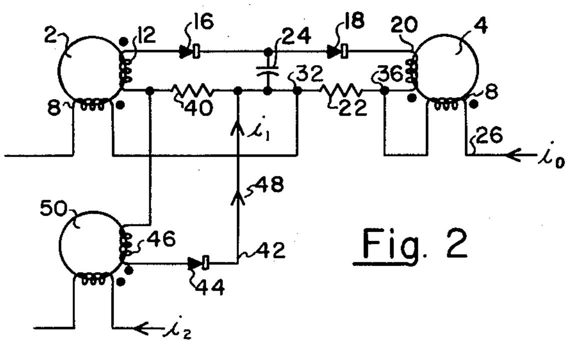
FIGURE 2 is a modification of the embodiment of the invention shown in FIGURE 1 wherein an inhibit circuit is employed in conjunction with the transfer circuit of the invention.

Now directing attention to FIGURE 2, there is shown a transfer circuit, employing cores 2 and 4 in a shift register, which serves to perform an inhibit operation. The inhibit operation is performed by means of a circuit comprising a resistance 40, conductor 42, diode 44, and winding 46. The resistance 40, like its companion resistance 22, will have a potential across itself when current flows through it in the direction of arrow 48. The potential across resistance 40 acts to cancel any voltage induced in winding 12 which would cause diode 16 to conduct. Thus when a current pulse of the proper polarity flows through resistance 40 at the time a transfer current $i_0$ is passed through winding 8 of core 2, currents arising from readout potentials induced in winding 12 are inhibited and are not able to pass through diode 16. The current $i_1$ through resistor 40 occurs at the same time as the current $i_2$ in core 50 to permit the inhibiting to take place. The current $i_0$ through resistor 22, as before noted, cuts off diode 18 and thus prevents any readout voltage in winding 12 from causing current flow through input winding 20 should conditional current $i_1$ not occur.

The embodiment of FIGURE 2 is a versatile circuit in a computer device or a logic solving device in that it provides for the inhibition or the transfer of readout pulses. Although winding 46 is shown wound around a core 50 so that the inhibiting current through the resistance 40 is initiated as a consequence of the switching of a core, it is understood that the inhibiting current could originate as an output of a gating or coincidence circuit, or be the resulting output pulse of any other logical operation performed elsewhere in a computer device.

Figure 3:
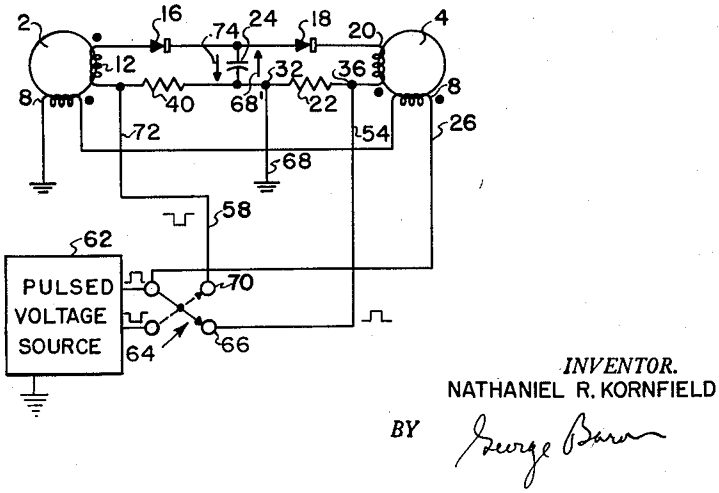
FIGURE 3 is a further embodiment of the invention showing an improved reversible shift register.

FIGURE 3 discloses a reversible shift register embodiment of the invention. If it is desired to transfer the information stored in core 2 to core 4, then the operation of FIGURE 3 is substantially identical with that of FIGURE 1, namely, current from pulsed voltage source 62 enters switch 64, terminal 66, conductor 54, passes through resistance 22, lead 68, and returns to ground. The diode 18 is thus back biased so that any current flowing through diode 16, as a result of the switching of core 2 from "1" to "0," cannot flow through diode 18 but passes only through capacitor 24 to charge this capacitor. Upon termination of the current pulse through resistance 22, the back bias is removed from diode 18 and a discharge current flows from capacitor 24 in the direction of arrow 68′, such discharge current serving to switch core 4 to a "1" upon flowing into the undotted terminal of winding 20.

By changing the position of switch 64 so that a circuit connection is made with contact 70, the current pulse from source 62 enters, but now of the opposite polarity, resistance 40 through lead 68 and leaves through lead 72. The current pulse through resistance 40 places a back bias on diode 16 similar to the inhibit bias explained in connection with FIGURE 2. However the attendant bias on diode 18 is not present. Thus, if an attempt is made to transfer a "1" from core 4 to core 2, the winding 12 of core 2 is decoupled by such back bias on diode 16. As a consequence of such decoupling, capacitor 24 is charged, and upon termination of the current pulse through resistance 40, discharge current flows in the direction of arrow 74 into the undotted terminal of winding 12 to switch core 2 to a "1" state.

Therefore it is seen that a reliable means has been disclosed for attaining various functions in a one core per bit shift register. Thus, an improved circuit is provided for clearance of information from cores and transfer of the information cleared from the cores to adjacent cores in said array. Accordingly, a single pulse interval is employed to carry out the entire sequence of operations, and the improved circuit may be operated to perform the inhibit function or to pass information in either direction.

What is claimed is:

1. In a one core per bit shift register employing a conductor for carrying advancing current through shift windings upon the cores of the shift register comprising, a transferor core having a winding thereon, a transferee core having a winding thereon, said transferor and transferee cores each being capable of assuming either of two stable states of magnetic remanence, a transfer loop coupling said windings, two unidirectional impedance means in series in said transfer loop and oriented to support current flow in a single direction through the loop, a capacitor having one terminal connected to both said unidirectional impedance means and the other terminal connected to both windings on the cores, a third impedance element in said transfer loop, means for passing advancing current through said third impedance element at the same time as said advancing current is passed through said shift windings to bias one of said unidirectional means to cutoff while permitting the other to conduct, and means for inhibiting the passage of information from the transferor core as a charging current to said capacitor during the presence of such advancing current.

2. The invention as defined in claim 1 wherein said inhibiting means comprises a fourth impedance element in said transfer loop, and means for creating a potential drop of such polarity across said fourth impedance element during the presence of said advancing current so as to inhibit the passage of information from the transferor core as a charging current to said capacitor.

3. The invention as defined in claim 2 wherein the means for creating such potential drop across said fourth impedance element is the current induced in an output winding of a switching bistable core, said output winding being in series circuit with said fourth impedance element.

4. A reversible one core per bit shift register comprising a first bistable core and a second bistable core each capable of assuming either of two stable states of magnetic remanence, a common advancing winding threading both cores, a transfer loop coupling said cores and comprising a first information transfer winding on said first core, two unidirectional impedance devices oriented to support current flow only in one direction through said transfer loop, a second information transfer winding on said second core, and two resistive elements, a capacitor in said transfer loop shunting said two information transfer windings and forming two charging paths in said transfer loop, one charging path comprising one of said resistive elements, said first information transfer winding, one of said unidirectional impedance devices and said capacitor, and the other charging path comprising said other unidirectional impedance element, said second information transfer winding, said other resistive element and said capacitor, a source of signal pulses, and switch means for simutlaneously connecting said source of signal pulses to said common advancing winding and to one of said resistive elements, whereby that unidirectional impedance element lying in the same charging path as said selected resistive element is biased to cut-off during the presence of a signal pulse.

5. In a one core per bit shift register employing a conductor for carrying advancing current through shift windings upon the cores of the shift register comprising, a first core having a first winding, a second core having a second winding, said first and second cores each being capable of assuming either of two stable states of magnetic remanence, a transfer loop coupling said first and second windings, two unidirectional impedance means in series in said transfer loop and oriented to support current flow in a single direction through the loop, a capacitor having one terminal connected to both said impedance means and the other terminal connected to both the windings on the cores, a third impedance coupled in said transfer loop, means connected for passing current through the third impedance in the presence of said advancing current to bias one of said unidirectional means to cutoff while permitting the other to conduct, a fourth impedance coupled in the transfer loop, means provided for passing current through the fourth impedance in the presence of said advancing current to bias the other one of said unidirectional means to cutoff while permitting the said one to conduct, current being selectively passed through only one of said third or fourth impedances to thereby control the direction of transfer of information between said cores.

6. A single core per bit shift register for processing information, comprising a series of register stages, each said stage having a single magnetic core of material exhibiting a substantially rectangular hysteresis characteristic, transfer means including unilaterally conductive elements for transmitting information between respective ones of said series of register stages, means for applying bias signals to chosen ones of said unilaterally conductive elements to selectively pass information from one of said stages to either a preceding stage or a succeeding one in said series.

7. In a one core per bit magnetic shift register having a shift winding on each magnetic core, first and second magnetic cores each capable of assuming either of two stable states of magnetic remanence, an output winding on said first core and an input winding on said second core, a transfer circuit interconnecting said cores including said output and input windings, first and second unidirectional conducting impedance means serially connected between said output and input windings and oriented to permit current flow through said transfer circuit only in one direction, a capacitor disposed between said two unidirectional impedance means and connected in parallel with said input and output windings, said capacitor being adapted to be charged by current flow from said output winding through said first unidirectional impedance means and adapted to discharge current flow therefrom through said second unidirectional impedance means into said input winding, a resistor connected electrically in series with said input winding for developing a voltage thereacross in a direction to bias said second unidirectional means toward cutoff, an electrical circuit interconnecting said resistor in series with the shift winding on said first core, and means for supplying an advance current to said series circuit so as to shift said first core to one of its bistable states if it is in the other state and to bias said second unidirectional impedance means to cutoff by advance current flow through said resistor during the flow of such current, whereby said second unidirectional impedance means blocks current therethrough in the presence of said advance current but permits discharge of said capacitor through said input winding upon expiration of said advance current.

8. A one core per bit shift register comprising a transferror magnetic core and a transferree magnetic core, each capable of assuming either of two stable states of magnetic remanence, a transfer loop coupling said cores including a winding on said transferror core and a winding on said transferree core, two unidirectional conducting impedance means in series in said transfer loop and oriented so as to permit current flow only in one direction through said transfer loop, a capacitor connected in parallel across said windings, a resistor connected in series in said transfer loop for biasing said second unidirectional means to cutoff, a shift winding on said transferror core, an advance current carrying conductor interconnecting said shift winding and said resistor in series, an advance current source connected to said conductor for establishing advance current flow through said shift winding and said series connected resistor so as to provide cutoff bias to said second unidirectional impedance when advance current is flowing through said conductor.

9. In a one core per bit shift register employing a conductor for carrying advance current through a series of shift windings one coupled to each of the cores of said shift register, comprising a first magnetic core having a plurality of windings including an output winding, a second magnetic core having a plurality of windings including an input winding, said first and second cores each being capable of assuming either of two stable states of magnetic remanence, a transfer loop coupling said output and input windings, two unidirectional conducting impedance means connected in series in said transfer loop and oriented to permit current flow only in a single direction through said loop, a capacitor connected across said windings, said capacitor being charged by current flow from said output windings through one of said unidirectional impedance means and being discharged by current flow through the other of said unidirectional impedance means to said input windings, resistance means connected serially in said transfer loop and also connected serially in a separate circuit with said advance current conductor, and an advance current source connected to said conductor for passing current through said shift windings and through said resistance means to bias said other unidirectional means to cutoff while permitting said one unidirectional means to conduct, whereby voltage developed in said output winding during the presence of said advance current charges said capacitor but the discharge of said capacitor into said input windings is prevented until the expiration of said advancing current.

10. In a one core per shift register employing a conductor for carrying advancing current through a plurality of shift windings one on each of the cores of said shift register, a transferror core having a plurality of windings thereon including an output winding, a transferree core having a plurality of windings thereon including an input winding, said transferror and transferree cores each being capable of assuming either of two stable states of magnetic remanence, a transfer loop coupling said output and input windings, two unidirectional conducting impedance means in series in said transfer loop and oriented to permit current flow in a single direction through said loop, a temporary storage element connected intermediate said unidirectional impedance means to receive electrical signal information from said output winding on said transferror core through one of said unidirectional impedances and subsequently to transfer said electrical signal information through the other of said unidirectional impedance means to said input winding on said transferree core, a third impedance connected to said second unidirectional impedance means and also connected to said conductor for carrying advancing current, means for passing advancing current through said conductor to transfer signal information from said transferror core and to bias said other unidirectional impedance means to cutoff while permitting said one unidirectional impedance means to conduct, and a fourth impedance in said transfer loop for establishing a cut off bias voltage across said one unidirectional impedance means, said fourth impedance means including a third magnetic core capable of assuming either of two stable states of magnetic remanence and an advance winding on said core for switching said core from one of its stable states to the other and thereby establishing said biasing voltage across said fourth impedance means.

11. The combination set forth in claim 10 wherein said temporary storage means comprises a capacitor connected in parallel across said output and input windings of said transfer loop.

12. The combination set forth in claim 5 wherein said third and fourth impedances comprise resistors connected serially in said transfer loop, and wherein said conductor for carrying advancing current interconnects the shift windings on said first and second cores in series, and further including switching means for passing current selectively through one of said resistors simultaneously with the passage of advancing current flow through said conductor.

13. A reversible single core per bit shift register for processing information, comprising a series of register stages, each such stage having a single magnetic core formed of material exhibiting a substantially rectangular hysteresis characteristic and having a plurality of windings on said core, a transfer circuit interconnecting each core in said shift register to the succeeding one, each such transfer circuit including a winding on one core and a winding on the succeeding core, two unidirectional conducting devices electrically connected in series in said transfer circuit and oriented to permit current flow in a single direction through said circuit, a temporary storage element intermediate said unidirectional conducting devices for receiving current from one of said windings of the transfer circuit through one of said unidirectional devices and subsequently transmitting current through the other of said unidirectional devices to the other of said windings in the transfer circuit, means for applying bias signals selectively to one of said unidirectional devices to bias said one device to cut off during the presence of said bias signal while permitting the other unidirectional device to conduct and thereby selectively pass information from one of said stages to either a preceding stage or to a succeeding one in said series.

14. A reversible single core per bit shift register for processing information, comprising a series of register stages, each such stage having a single magnetic core formed of material exhibiting a substantially rectangular hysteresis characteristic and a plurality of windings on said core, a transfer circuit interconnecting each core in said shift register to the succeeding one, each such transfer circuit including a winding on one core and a winding on the succeeding core, two unidirectional conducting devices electrically connected in series in said transfer circuit and oriented to permit current flow in a single direction through said circuit, a temporary storage capacitor connected in parallel with said windings in said transfer circuit for receiving current from one of said windings of the transfer circuit through one of said unidirectional devices and subsequently transmitting current through the other of said unidirectional devices to the other of said windings in the transfer circuit, means for applying bias signals selectively to one of said unidirectional devices to cut off said one unidirectional device while permitting the other unidirectional device to conduct so as to selectively pass information from one of said cores to said capacitor for transfer to the succeeding core or from said succeeding core to said capacitor for transfer to said one core.

15. A reversible core per bit shift register for processing information as defined in claim 14 further including an advance winding on each core of said register and means for passing current through each of said advance windings simultaneously, and wherein said means for applying bias signals includes resistance means connected serially in each transfer circuit for establishing selective bias potentials, and switching means for passing current selectively through said resistance means simultaneously with advance current flow through the advance windings for selectively biasing one or the other but not both of said unidirectional conducting devices to cut off.

16. A one core per bit reversible shift register comprising a plurality of magnetic cores each capable of being magnetically saturated in either one of two stable conditions of saturation in response to applied energizing current pulses of a first polarity or of another polarity, forward and reverse information transfer circuit means interconnecting each of said magnetic cores to the succeeding and preceding cores of said shift register, respectively, for applying signal energizing current pulses of a selected one polarity from each said core to either adjacent core, means for applying a shift energizing current pulse to all of said cores simultaneously in a polarity opposite that of said signal energizing current pulses, temporary storage capacitive means included in said information transfer circuit means for intercepting and storing said signal energizing current pulses, said forward and reverse transfer circuit means having forward and reverse unidirectionally conductive gating means, a voltage source for selectively biasing such gating means to cutoff, and switching means for selectively applying said biasing voltage to either said forward or said reverse gating means to thereby transfer said signal energizing current pulses to a selective one of said adjacent cores and thus provide forward or reverse shift registration.

17. A reversible single element per bit shift register for processing information, comprising a series of register stages, each said stage having a single bistable element of material exhibiting a substantially rectangular hysteresis characteristic, a transfer circuit including delay means and unidirectional current conductive devices interconnecting successive ones of the bistable elements in a series array and operable to transmit information in either direction between respective ones of said series of register stages, and means for applying bias signals to chosen ones of said unidirectionally conductive devices selectively to pass information from one of said stages through a delay means to either a preceding stage or a succeeding stage in said series.

18. A reversible single element per bit shift register for processing information, comprising a series of register stages, each said stage having a single bistable element of material exhibiting a substantially rectangular hysteresis characteristic, a transfer circuit interconnecting successive ones of the bistable elements for transmitting information from each stage to an adjacent stage in either direction along the series of register stages, each said transfer circuit including delay means and unidirectional current conductive gating means, and means for applying biasing signals to chosen ones of said gating means selectively to pass information from one of said stages through a delay means to either a preceding stage or a succeeding stage in said series.

19. A one element per bit reversible shift register including, in combination, a pair of elements each capable of assuming one or the other of two stable conditions in response to applied energizing current pulses of a first polarity or of another polarity, forward and reverse information transfer circuit means interconnecting the two elements for applying signal energizing current pulses of a selected one polarity from each said element to the other element, means for applying a shift energizing current pulse to both of said elements simultaneously in a polarity opposite that of said signal energizing current pulses, said transfer circuit means including means for intercepting and storing said signal energizing current pulses and further including unidirectional current conductive gating means, and means for selectively applying a biasing voltage to said gating means to thereby transfer said signal energizing current pulses from a selective one of said pair of elements to the other element and thus provide either forward or reverse shift of information in the register.

20. A one element per bit reversible shift register including, in combination, a pair of elements each capable of assuming one or the other of two stable conditions in response to applied energizing current pulses of a first polarity or of another polarity, forward and reverse information transfer circuit means interconnecting the two elements for applying signal energizing current pulses of a selected one polarity from each said element to the other element, means for applying a shift energizing current pulse to both of said elements simultaneously in a polarity opposite that of said signal energizing current pulses, said transfer circuit means including means for intercepting and storing said signal energizing current pulses and further including unidirectional current conductive gating means, said gating means being responsive to a biasing voltage of one polarity for effecting transfer of information in one direction in the shift register and being responsive to a biasing voltage of the opposite polarity for effecting transfer of information in the opposite direction in the shift register, and means for selectively applying biasing voltages of opposite polarities to said gating means to thereby transfer said signal energizing current pulses from a selective one of said pair of elements to the other element and thus provide either forward or reverse shift of information in the register.

21. A one core per bit reversible shift register comprising a plurality of magnetic cores each capable of being magnetically saturated in either a first or second stable condition of saturation in response to applied energizing current pulses of a first or second polarity, forward and reverse information transfer circuit means interconnecting each of said magnetic cores to the succeeding and preceding cores of said shift register, respectively, for applying signal energizing current pulses of said first polarity from each said core to either adjacent core, means for applying a shift energizing current pulse of said second polarity to all of said cores simultaneously, temporary storage capacitive means included in each said information transfer circuit means for intercepting and storing said signal energizing current pulses, forward and reverse unidirectional conductive means included in said forward and reverse transfer circuit means for defining direction of current flow therein, and means for selectively rendering one of said unidirectional conductive means nonconductive to control the direction of transfer of said signal energizing current pulses to a selected one of said adjacent cores and thus provide forward or reverse shift registration.

References Cited in the file of this patent

UNITED STATES PATENTS

| | | |
|---|---|---|
| 2,652,501 | Wilson | Sept. 15, 1953 |
| 2,708,722 | An Wang | May 17, 1955 |
| 2,831,150 | Wright et al. | Apr. 15, 1958 |
| 2,964,736 | Ruhman | Dec. 13, 1960 |

OTHER REFERENCES

"Magnetic Shift Register Using One Core Per Bit," Kodis et al., Record I.R.E. Nat. Convention, March 23–26, 1953, part 7, pp. 38–42.

Logical and Control Function Performed With Magnetic Cores," Guterman et al. Proc. I.R.E., March 1955, pp. 291–298.